Patented Aug. 8, 1939

2,168,800

UNITED STATES PATENT OFFICE 2,168,800

DIAZOAMINO COMPOUNDS SOLUBLE IN WATER AND PROCESS OF PREPARING THEM

Herbert Kracker and Richard Schmid, Frankfort-on-the-Main-Hoechst, Germany, assignors to General Aniline Works, Inc., New York, N. Y., a corporation of Delaware No Drawing. Application October 14, 1936, Serial No. 105,630. In Germany October 17, 1935

8 Claims. (Cl. 260—140)

The present invention relates to water-soluble diazoamino-compounds of aminoazo-bodies and to a process of preparing these compounds.

We have found that diazoamino-compounds corresponding with the following general formula:

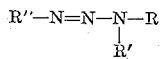

wherein R" stands for the radical of an amine capable of being coupled and free from solubilizing groups, R' for hydrogen, alkyl, hydroxyalkyl, aralkyl, aryl or hydroaryl, R stands for an aliphatic, araliphatic, aromatic, hydroaromatic or heterocyclic radical containing groups imparting solubility in water such as, for instance, carboxylic acid, sulfonic acid or hydroxyl groups, or wherein R and R' jointly stand for the radical of a heterocyclic ring system in which the nitrogen is the hetero-atom and which contains groups lending solubility in water, and which are obtainable from diazotized amines, which in their non-diazotized form are capable of being coupled with diazo-compounds to form amino-azo-bodies, and nitrogen bases soluble in water, may be combined with diazo-compounds not containing any group lending solubility in water in a smooth reaction and with a very good yield with formation of water-soluble diazoamino-compounds of amino-azo-bodies. The compounds obtained may be regarded as corresponding with the following general formula:

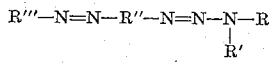

wherein R, R' and R" have the meaning indicated above and R'" stands for an aromatic or a heterocyclic radical which does not contain any solubilizing group.

Thus, for instance, the diazoamino-compound from aminohydroquinone-dimethyl ether and sarcosine may be combined with diazotized para-nitraniline to form a diazoamino-compound of the following constitution:

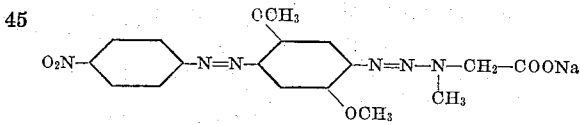

By using, instead of aminohydroquinone-dimethyl ether, other amines capable of being coupled, for instance, 1-naphthylamine, 1-amino-2-methoxy-5-methylbenzene, 1-amino-3-methoxy-4-methylbenzene and the like, instead of sarcosine any other nitrogen bases which are known as stabilizers for diazoamino-compounds and, instead of diazotized para-nitraniline, other diazo-compounds, the diazo-amino-compounds of the corresponding aminoazo-bodies are formed in the same manner.

It has not hitherto been known, and must be regarded as surprising that the diazo-group present in the form of the diazoamino group allows, in the aromatic radical to which it is bound, another coupling with a diazo-compound to form an azo-body.

The diazoamino-compounds of aminoazo-bodies thus obtained are valuable intermediates for the manufacture of dyestuffs.

The following examples serve to illustrate the invention, but they are not intended to limit it thereto:

(1) 30.6 grams of 1-amino-2.5-dimethoxy-benzene are diazotized in the usual manner at 3° C.–5° C. with 60 cc. of hydrochloric acid of 20° Bé. and 100 cc. of 2N-sodium nitrite solution. The diazo-solution obtained is caused to run slowly at 0° C. into 125 grams of a sarcosine solution of 15 per cent. strength to which there has been added a solution of 50 grams of calcined sodium carbonate in water. The formation of the diazoamino-body is finished after some hours. By salting out with sodium chloride amounting to 15 per cent. of the volume of the solution, the diazoamino-compound is completely precipitated in the form of a reddish-brown crystalline mass and is then isolated.

80 grams of the diazoamino-compound obtained are dissolved in 500 cc. of water at 25° C. to a clear solution, and a solution at 20° C. of 80 grams of calcined sodium carbonate in water is then added. Into this solution there is run slowly a diazo-solution prepared in the usual manner from 41.4 grams of para-nitraniline. The azo-dyestuff is rapidly formed and a clear solution having an alkaline reaction towards Brilliant-Yellow is obtained. After stirring for some hours, the dyestuff is completely precipitated by cautiously neutralizing the solution with dilute hydrochloric acid until it shows only a feebly alkaline reaction towards Brilliant-Yellow and salting out. After filtering by suction and drying at about 60° C. the compound is obtained in the form of a reddish-brown powder with a yield of 85 per cent. of the theoretical. It has the following formula:

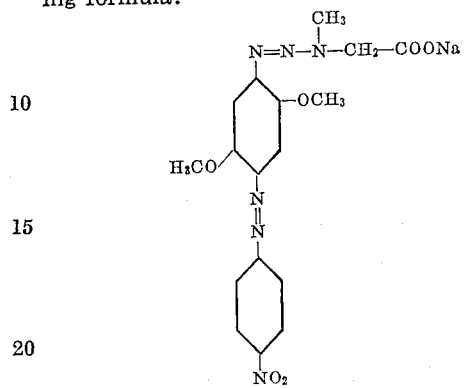

(2) 137 grams of 1 - amino - 3 - methoxy - 4 - methylbenzene are diazotized in the usual manner. The diazo-solution is slowly run at 0° C. into a solution which has been prepared as follows: 149 grams of methyltaurine are dissolved in 500 cc. of ice water; a solution of 280 grams of calcined sodium carbonate in 1000 cc. of water is then added. The diazoamino-compound is completely formed after some hours. It separates in the form of a yellowish-brown paste; after filtering with suction it is dried at 60° C.–70° C.

150 grams of the diazoamino-compound thus obtained are mixed, while stirring, with 1000 cc. of water and a small quantity of ice. In order to obtain a good dispersion, 15 cc. of a solution of 30 per cent. strength of the reaction product of 20 mols. of ethylene oxide upon 1 mol. of octodecyl alcohol are added. At 3° C.–5° C. there is slowly run into the suspension of the diazoamino body a diazo-solution which is prepared in the usual manner from 86 grams of 1-amino-2-chloro-4-nitrobenzene and, simultaneously, a suspension of 200 grams of sodium bicarbonate in 600 cc. of water is added in small portions so that the whole shows always an alkaline reaction to Brilliant-Yellow. The addition of the whole quantity of bicarbonate at the same time must be avoided in order to prevent decomposition of the diazo-solution before coupling has occurred. The formation of the azo-dyestuff sets in at once with production of a reddish-brown coloration and is finished the next day. The reaction must be feebly but distinctly alkaline to Brilliant-Yellow. The dyestuff is precipitated for the most part in the form of reddish-brown crystals. By adding sodium chloride amounting to 5 per cent. of the volume of the liquid, the dyestuff is completely precipitated. After filtering with suction and drying at about 60° C. the compound is obtained in the form of a dark red-brown powder with a nearly theoretical yield.

(3) 40 grams of the brown diazoamino-compound, which is obtainable by combining in the usual manner diazotized 1-naphthylamine with 1-methylaminobenzene-2-carboxylic acid-4-sulfonic acid, are dissolved in 500 cc. of water at ordinary temperature, cooled to 5° C. and 30 grams of calcined sodium carbonate dissolved in water are added. Into this solution there is run slowly a diazo-solution prepared in the usual manner from 13.7 grams of 1-amino-2-ethoxybenzene. The azo-dyestuff is formed slowly and is finished the next day. The reaction must be distinctly alkaline to Brilliant-Yellow. By cautiously neutralizing until a feebly alkaline reaction to Brilliant-Yellow is obtained and by salting out, the dyestuff is completely precipitated. After drying, the diazoamino-compound is obtained in the form of a black-brownish powder with a yield of 92 per cent. of the theoretical.

(4) 41.2 grams of the feebly yellowish-brown crystalline diazoamino-compound, which is obtainable in the usual manner from diazotized 1-amino-2-methoxy-5-methylbenzene and sarcosine, are dissolved in 400 cc. of water. 30 grams of calcined sodium carbonate are then added in the form of a solution of 15–20 per cent. strength and a diazo-solution prepared in the usual manner from 15.2 grams of 1-amino-2-nitro-4-methylbenzene is then slowly run in. The formation of the azo-dyestuff sets in slowly and is finished the next day. The precipitated dyestuff is filtered with suction and dried, at about 60° C. It is a red-brown powder and is obtained with a yield of 70 per cent. of the theoretical.

The following table indicates a number of other diazoamino-compounds obtainable according to the present invention:

| No. | Diazo-compound from— | Coupled with the diazoamino-compound from— | | Properties of the diazoamino - compound of the aminoazo - body obtained |
|---|---|---|---|---|
| | | Diazotized— | And— | |
| 1 | 1 - amino - 2.6 - dichloro - 4 - nitrobenzene. | 1-amino-2.5-dimethoxy-benzene. | Methyltaurine | Black-brown crystalline powder. |
| 2 | 1 - amino - 2 - methyl - 5 - chlorobenzene. | ...do... | Proline | Dark brown crystalline powder. |
| 3 | 1 - amino - 2.6 - dichloro - 4 - nitrobenzene. | ...do... | 1 - methylamino - 2 - hydroxypropane-3-sulfonic acid. | Dark brown powder. |
| 4 | 1-amino-4-chloro-naphthalene | ...do... | 1 - ethylamino - 2 - hydroxypropane-3-sulfonic acid. | Black-brown powder. |
| 5 | 1-amino-3-nitro-benzene | 1 - amino - 3 - methoxy - 4 - chlorobenzene. | 1 - amino - benzene - 2 - carboxylic acid-5-sulfamide. | Dark brown crystalline powder. |
| 6 | 1-amino-2.5-dichlorobenzene | ...do... | Hydroxyethyl-amino-acetic acid | Do. |
| 7 | 1 - amino - 2 - chloro - 5 - trifluoromethyl-benzene. | 1 - amino - 3 - methoxy - 5 - bromobenzene. | Pipecolinic acid | Do. |
| 8 | 1 - amino - 2 - nitro - 4 - methoxybenzene. | ...do... | 1 - methylamino - benzene - 2 - carboxylic acid-5-sulfonic acid. | Do. |
| 9 | 1-amino-2-methyl-4-nitrobenzene | 1-amino-3-methoxy-4-methylbenzene. | Cyanamide | Dark red-brown crystalline powder. |
| 10 | 1-amino-2.4-dichloro-6-nitrobenzene. | ...do... | Piperidine-alpha-sulfonic acid | Do. |
| 11 | 4 - amino - 3 - trifluoromethylbenzene. | ...do... | Butylamino-acetic acid | Do. |
| 12 | 1-amino-2 - nitro - 4 - trifluoromethylbenzene. | ...do... | 1-aminobenzene-2-carboxylic acid-5-sulfonic acid. | Do. |
| 13 | 1-amino-2-chloro-4-nitrobenzene. | ...do... | 1 - methyl - amino - 2 - hydroxypropane-3-sulfonic acid. | Dark-brown powder. |
| 14 | 2-amino-1-nitronaphthalene | ...do... | Aniline-2.5-disulfonic acid | Do. |
| 15 | 1-amino-4-nitrobenzene | 1-amino-3.4-dimethoxybenzene. | Methylglucamine | Dark-red-brown crystalline powder. |

| No. | Diazo-compound from— | Coupled with the diazoamino-compound from— | | Properties of the diazoamino-compound of the aminoazo-body obtained |
|---|---|---|---|---|
| | | Diazotized— | And— | |
| 16 | 1-amino-2-methyl-4-chlorobenzene | ...do... | Piperazino-acetic acid | Do. |
| 17 | 1-amino-4-methoxy-benzene | 1-naphthylamine | Hydroxyethyl-taurine | Brown-black powder. |
| 18 | 1-amino-2-nitrobenzene | 1-amino-2-methoxy-naphthalene | Pyrrolidine-alpha-sulfonic acid | Do. |
| 19 | 1-amino-2-methoxy-5-nitrobenzene | ...do... | 1-aminobenzene-2-carboxylic acid-4-sulfonic acid | Do. |
| 20 | 1-amino-2-methoxy-5-chlorobenzene | 1-amino-5-methoxynaphthalene | Piperidine-beta-sulfonic acid | Do. |
| 21 | 1-amino-2-methyl-3-chlorobenzene | ...do... | Methyltaurine | Do. |
| 22 | 1-amino-3-chlorobenzene | 1-amino-2-methylnaphthalene | Proline | Do. |
| 23 | 1-amino-5-trifluoromethyl-phenyl-2-ethylsulfone | 1-amino-2-methoxy-5-methylbenzene | Hydroxyethyl-taurine | Red-brown powder. |
| 24 | 1-amino-2-methyl-4-nitrobenzene | 1-amino-2-methoxy-5-methylbenzene | 1-methylamino-benzene-2-carboxylic acid-4-sulfonic acid | Dark brown powder. |
| 25 | 1-amino-2-chloro-4-nitrobenzene | 1-amino-2-methyl-5-methoxybenzene | Butylamino-acetic acid | Do. |
| 26 | 1-amino-2-methoxy-5-nitrobenzene | ...do... | Methylglucamine | Do. |
| 27 | 1-amino-3.5-bistrifluoromethylbenzene | 1-amino-3-methoxybenzene | Methyltaurine | Do. |
| 28 | 1-amino-2-methoxy-4-chloro-benzene | ...do... | Piperidine-alpha-sulfonic acid | Red-brown powder. |
| 29 | 1-amino-3.5-bis-trifluoromethylbenzene | 1-amino-2.5-diethoxy-benzene | 1-aminobenzene-2-carboxylic acid-4-sulfonic acid amide | Do. |
| 30 | 1-amino-3-chlorobenzene | ...do... | Sarcosine | Do. |
| 31 | 1-amino-2-nitro-4-methylbenzene | 1-amino-3-methoxy-6-chlorobenzene | Ethylene-diamine-di-acetic acid | Brown powder. |
| 32 | 1-amino-2-methoxybenzene-5-sulfonic acid-diethylamide | ...do... | Methyltaurine | Do. |
| 33 | 1-amino-3-methyl-4.6-dichlorobenzene | 1-amino-3.5-dimethoxybenzene | Piperidine-alpha-carboxylic acid | Do. |
| 34 | 1-amino-2-trifluoromethyl-5-chlorobenzene | ...do... | Cyanamide | Yellow-brown powder. |
| 35 | 1-amino-2-chlorobenzene | 1-amino-3-ethoxy-4-methylbenzene | Butylamino-acetic acid | Red-brown powder. |
| 36 | 1-amino-3-benzoylamino-4.6-dimethylbenzene | ...do... | Piperidine-beta-carboxylic acid | Dark brown powder. |
| 37 | 2.4-dichloroaniline | 1-amino-4-methyl-2.5-dimethoxybenzene | Phenylglycine-3-sulfonic acid amide | Do. |
| 38 | 1-amino-2-methyl-4.5-dichlorobenzene | ...do... | 1-aminobenzene-2-carboxylic acid-4-sulfonic acid | Do. |
| 39 | 1-amino-2-methoxy-5-chlorobenzene | 1-amino-4-chloro-2.5-dimethoxybenzene | Hydroxyethyl-taurine | Do. |
| 40 | 2-amino-diphenylsulfone | ...do... | 5-amino-furane-2-carboxylic acid | Do. |
| 41 | 1-amino-4-benzoylamino-2-methoxy-5-methylbenzene | 1-amino-4-bromo-2.5-diethoxybenzene | Hydroxyethylamino-acetic acid | Black-brown powder. |
| 42 | 1-amino-3-nitrobenzene | ...do... | 1-methylamino-2-hydroxypropane-3-sulfonic acid | Do. |
| 43 | 1-amino-2-nitro-4-methoxy-benzene | 1-amino-2.4.5-trimethoxybenzene | Cyclohexyl-amino-acetic acid | Dark brown powder. |
| 44 | 1-amino-2-chloro-4-nitrobenzene | ...do... | 1-methylamino-hexahydrobenzene-3-sulfonic acid | Do. |
| 45 | 1-amino-2-methoxy-4-nitrobenzene | 2-amino-4-methoxy-naphthalene | Oxethylamino-acetic acid | Brown-black powder. |
| 46 | 1-amino-4-benzoylamino-2-chloro-5-methoxybenzene | ...do... | Piperidine-alpha-sulfonic acid | Do. |
| 47 | 1-amino-2-methoxy-4-chloro-benzene | 1-amino-3-ethoxy-benzene | Cyclohexyl-amino-acetic acid | Brown powder. |
| 48 | 1-amino-4-benzoylamino-2.5-dimethoxybenzene | ...do... | Piperazino-acetic acid | Dark brown powder. |
| 49 | 1-amino-4-nitrobenzene | 1-amino-4-benzoyl-amino-2.5-dimethoxy-benzene | 1-methylamino-2-hydroxy-propane-3-sulfonic acid | Black-brown powder. |
| 50 | 2.5-dichloro-aniline | ...do... | 1-amino-naphthalene-2.4-disulfonic acid | Do. |
| 51 | 1-amino-4-chloro-2-nitro-benzene | 1-amino-4-benzoylamino-2.5-diethoxy-benzene | Beta-gamma-di-hydroxypropylamino-acetic acid | Do. |
| 52 | 1-amino-2.4-dinitro-benzene | ...do... | Hydroxy-ethylamino-ethane-sulfonic acid | Do. |

We claim:

1. The process which comprises combining with diazo-compounds not containing groups imparting solubility in water selected from the group consisting of carboxylic acid, sulfonic acid and hydroxyl groups the diazoamino-compounds corresponding with the following general formula:

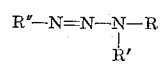

wherein R'' stands for the radical of an amine capable of being coupled selected from the group consisting of radicals of the benzene and naphthalene series not containing groups imparting solubility in water selected from the group consisting of carboxylic acid, sulfonic acid and hydroxyl groups, R' stands for a member of the group consisting of hydrogen, alkyl, hydroxyalkyl, hydroaryl and a radical of the benzene series, R for a member of the group consisting of aliphatic, hydroaromatic and heterocyclic radicals and radicals of the benzene and naphthalene series containing groups imparting solubility in water selected from the group consisting of carboxylic acid, sulfonic acid and hydroxyl groups, or wherein R and R' jointly stand for the radical of a heterocyclic ring system in which the nitrogen is the hetero-atom and which contains groups lending solubility in water selected from the group consisting of carboxylic acid, sulfonic acid and hydroxyl groups.

2. The process which comprises combining with diazotized 1-amino-2-chloro-4-nitrobenzene the diazoamino-compound obtainable from diazotized 1-amino-3-methoxy-4-methylbenzene and 1-methylamino-2-hydroxypropane-3-sulfonic acid and corresponding with the following formula:

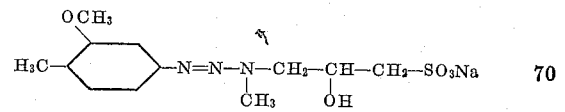

3. The process which comprises combining with diazotized 1-amino-2.6-dichloro-4-nitrobenzene the diazoamino-compound obtainable from diazotized 1-amino-2.5-dimethoxybenzene and 1-methylamino-2-hydroxypropane-3-sulfonic acid and corresponding with the following formula:

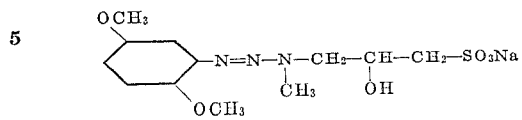

4. The process which comprises combining with diazotized 1-amino-2-ethoxybenzene the diazoamino-compound obtainable from diazotized 1-naphthylamine and 1-methylaminobenzene-2-carboxylic acid-4-sulfonic acid and corresponding to the following formula:

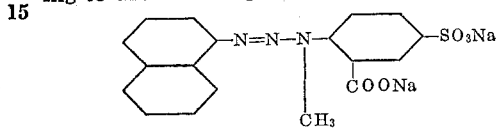

5. The diazoamino-compounds soluble in water corresponding with the following general formula:

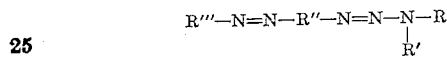

wherein R″ stands for the radical of an amine capable of being coupled selected from the group consisting of radicals of the benzene and naphthalene series not containing groups imparting solubility in water selected from the group consisting of carboxylic acid, sulfonic acid and hydroxyl groups, R′ stands for a member of the group consisting of hydrogen, alkyl, hydroxyalkyl, hydroaryl and a radical of the benzene series, R for a member of the group consisting of aliphatic, hydroaromatic and heterocyclic radicals and radicals of the benzene and naphthalene series containing groups imparting solubility in water selected from the group consisting of carboxylic acid, sulfonic acid and hydroxyl groups, or wherein R and R′ jointly stand for the radical of a heterocyclic ring system in which the nitrogen is the hetero-atom and which contains groups lending solubility in water selected from the group consisting of carboxylic acid, sulfonic acid and hydroxyl groups and R‴ means a member of the group consisting of radicals of the benzene and naphthalene series not containing groups imparting solubility in water selected from the group consisting of carboxylic acid, sulfonic acid and hydroxyl groups, being yellow to brown colored compounds.

6. The diazoamino-compound of the following formula:

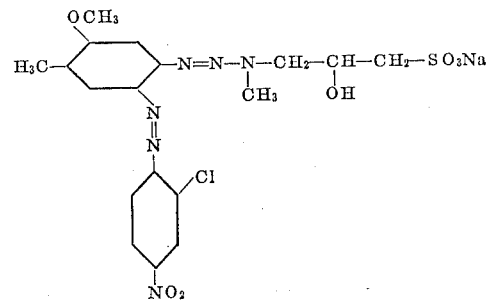

being a dark-brown powder soluble in water.

7. The diazoamino-compound of the following formula:

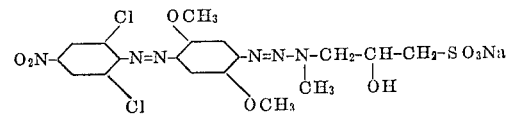

being a dark-brown powder soluble in water.

8. The diazoamino-compound of the following formula:

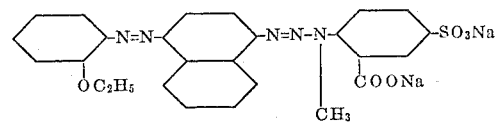

being a black-brownish powder soluble in water.

HERBERT KRACKER.
RICHARD SCHMID.